United States Patent
Sherman

(10) Patent No.: US 6,168,292 B1
(45) Date of Patent: Jan. 2, 2001

(54) LAMP

(75) Inventor: Roger N. Sherman, Jamaica Plain, MA (US)

(73) Assignee: Tensor Corporation, Chelsea, MA (US)

( * ) Notice: Under 35 U.S.C. 154(b), the term of this patent shall be extended for 0 days.

(21) Appl. No.: 09/189,435

(22) Filed: Nov. 10, 1998

(51) Int. Cl.⁷ ............................ F21V 21/08; F21V 21/02; F21V 21/28
(52) U.S. Cl. .................. 362/287; 362/419; 362/427; 362/85; 362/33
(58) Field of Search ...................... 362/287, 419, 362/427, 413, 85, 127, 133, 253, 351, 319, 198, 33

(56) References Cited

U.S. PATENT DOCUMENTS

| | | | |
|---|---|---|---|
| 3,584,793 | * | 6/1971 | Ilzig ........................... 362/427 |
| 3,755,668 | * | 8/1973 | Moreschini ................. 362/282 |
| 4,112,486 | * | 9/1978 | Tovi ........................... 362/419 |
| 4,475,705 | | 10/1984 | Henneberg et al. . |
| 4,965,708 | | 10/1990 | Louis . |
| 5,101,333 | | 3/1992 | Glassford . |
| 5,103,384 | | 4/1992 | Drohan . |
| 5,122,941 | | 6/1992 | Gross et al. . |
| 5,130,551 | * | 7/1992 | Nafziger et al. .............. 250/492.1 |
| 5,209,562 | | 5/1993 | Glassford . |
| 5,339,234 | * | 8/1994 | Russello et al. .............. 362/419 |
| 5,521,803 | | 5/1996 | Eckert et al. . |
| 5,549,268 | | 8/1996 | Hopwood . |
| 5,615,945 | | 4/1997 | Tseng . |
| 5,616,945 | * | 4/1997 | Tseng ........................... 362/226 |
| 5,655,833 | * | 8/1997 | Raczynski .................... 362/419 |
| 5,707,137 | * | 1/1998 | Hon .............................. 362/198 |
| 5,722,754 | | 3/1998 | Langner . |
| 5,786,861 | | 7/1998 | Parker . |

\* cited by examiner

*Primary Examiner*—Stephen Husar
*Assistant Examiner*—David V. Hobden
(74) *Attorney, Agent, or Firm*—Holland & Knight LLP; James H. Beusse

(57) ABSTRACT

A lamp comprises a base, a flexible arm extending from the base, and a lampshade attached to the other end of the flexible arm by means of two cooperating connecting members that allow the lampshade to be rotated about a first axis and about a second axis perpendicular to the first. The base may be slidably held by a bracket attached by adhesive or by other bonding material, to a computer monitor, workstation, or other device. A socket within the lamp shade accepts a high intensity bulb such as a 13-watt compact fluorescent bulb.

12 Claims, 6 Drawing Sheets

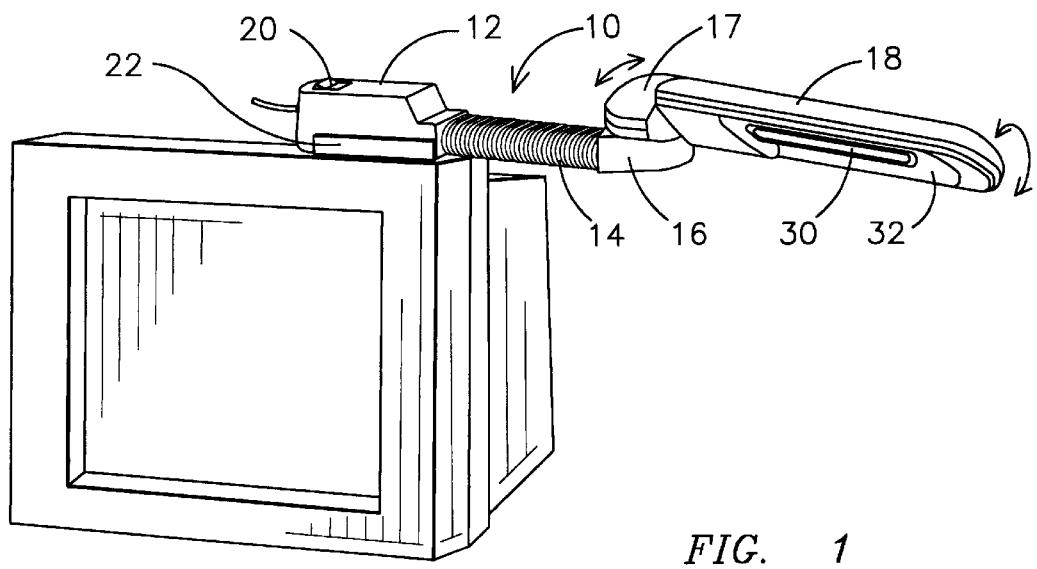
FIG. 1
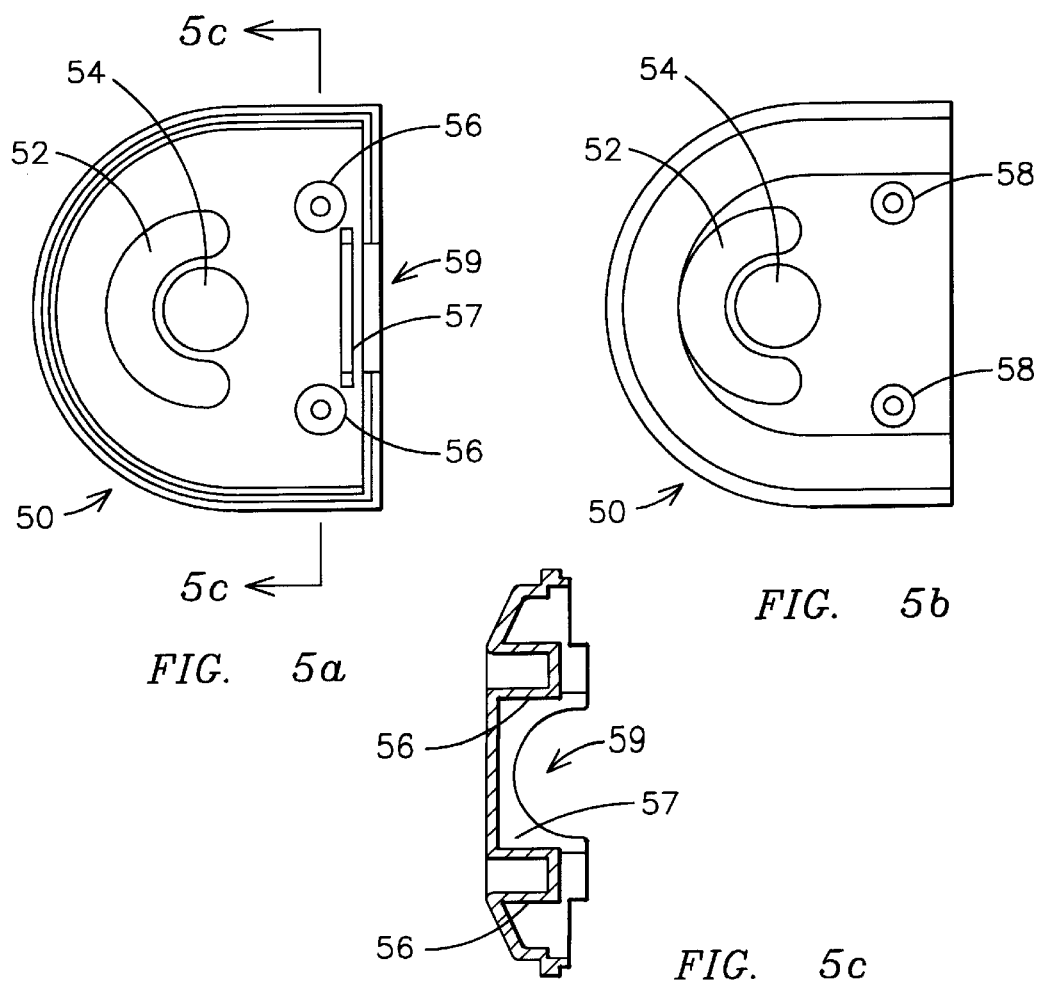
FIG. 5a
FIG. 5b
FIG. 5c

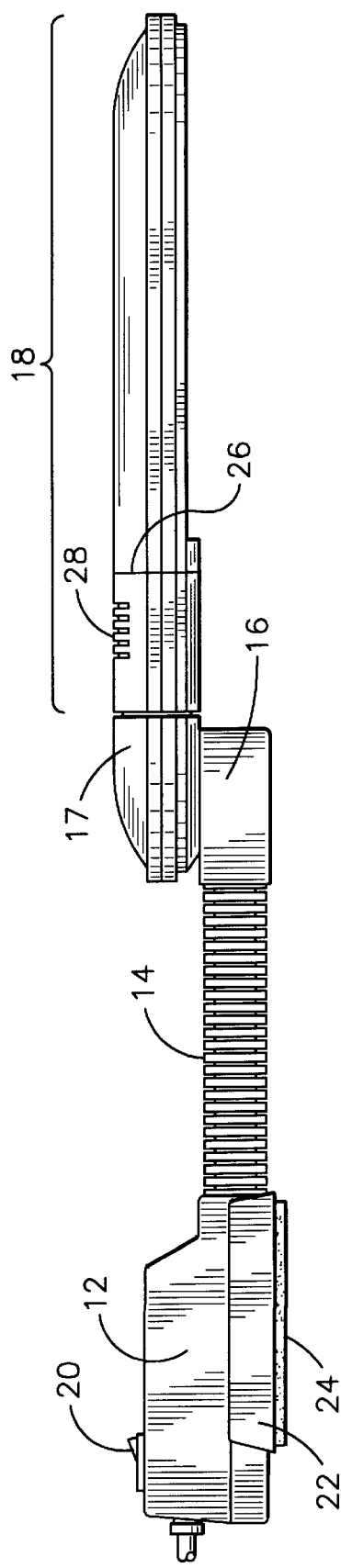
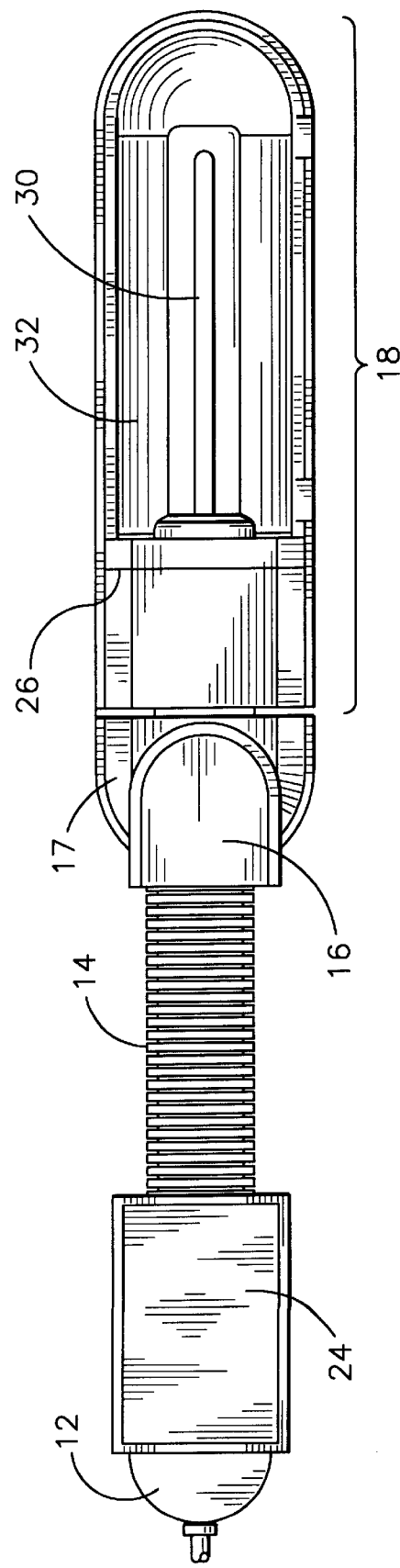
FIG. 2
FIG. 3

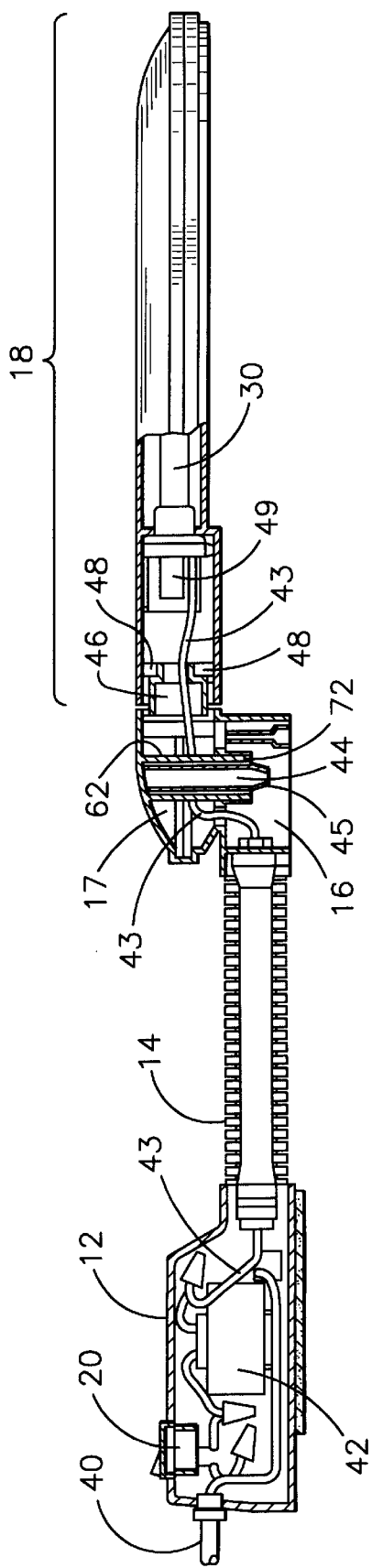
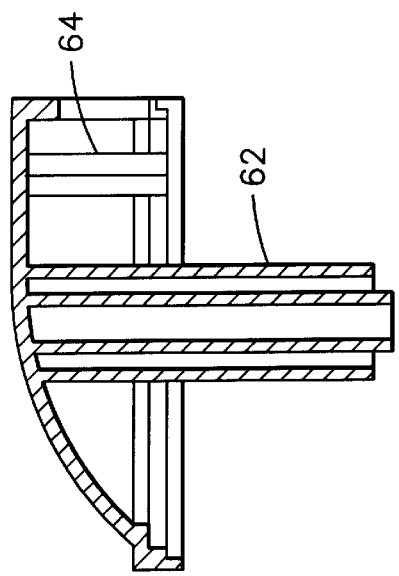
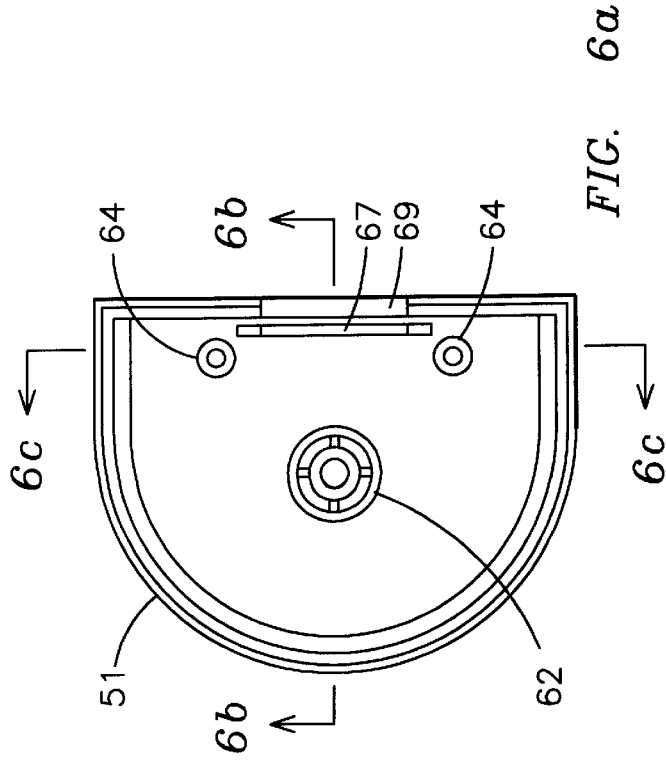
FIG. 4
FIG. 6b
FIG. 6a

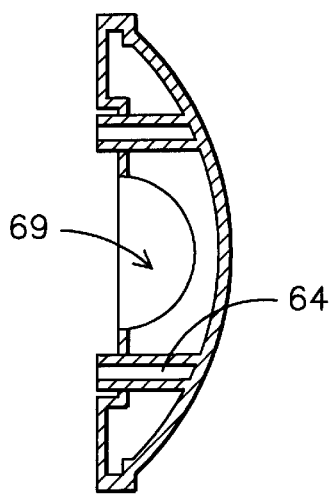
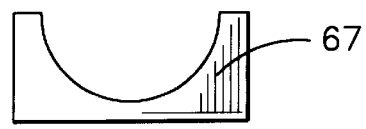
FIG. 6d
FIG. 6c
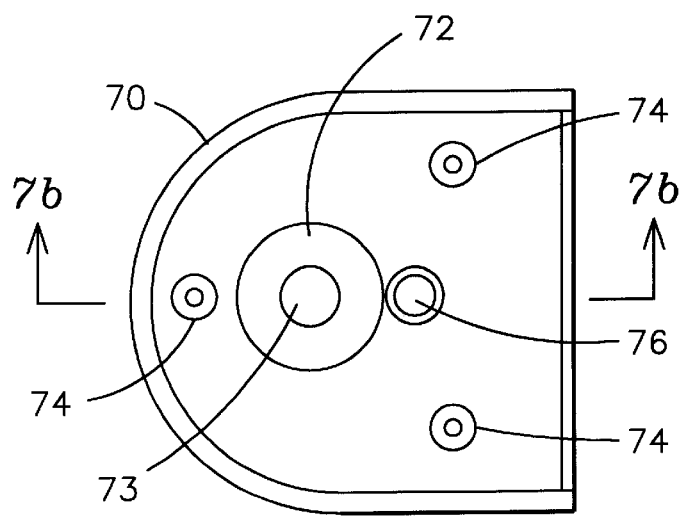
FIG. 7a
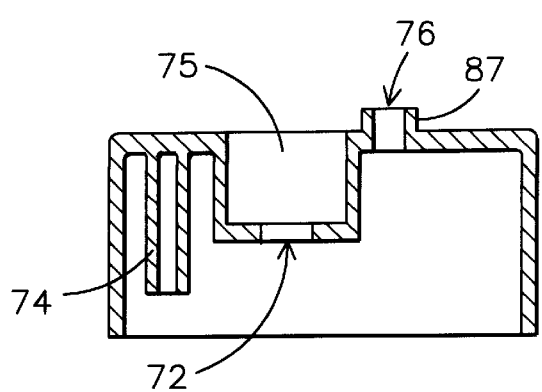
FIG. 7b

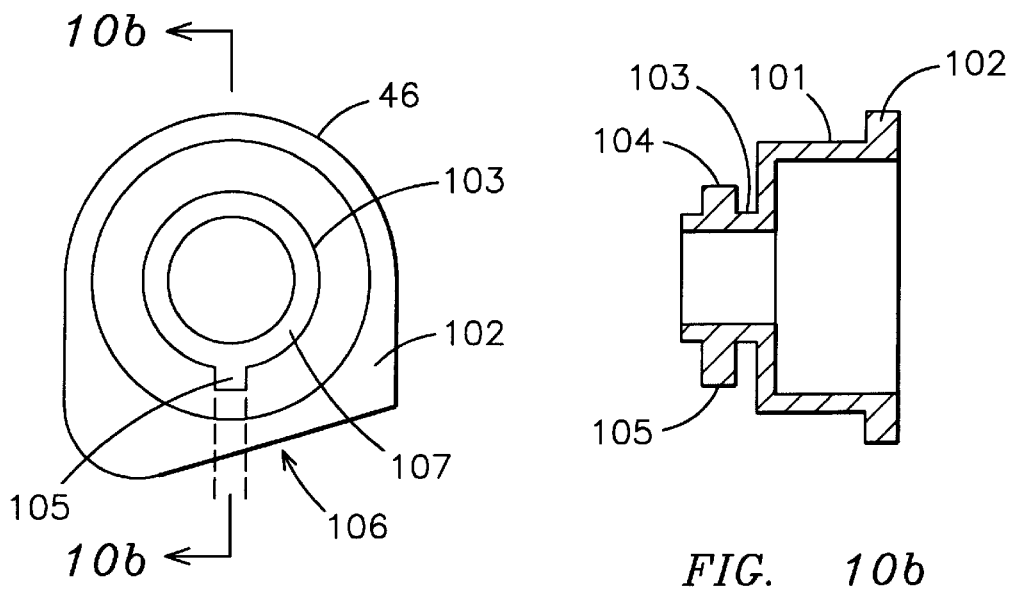
FIG. 10a
FIG. 10b
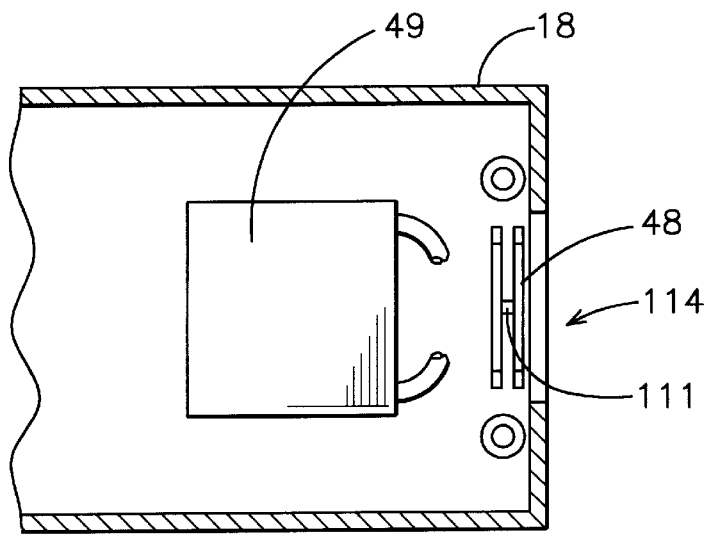
FIG. 11a
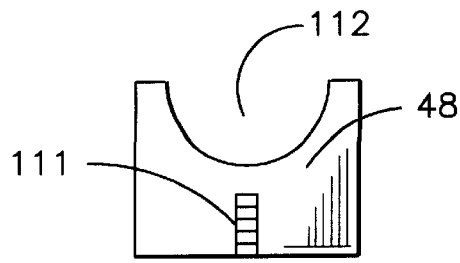
FIG. 11b

LAMP

FIELD OF THE INVENTION

This invention relates to lamps, and more particularly to a lamp for placement atop or in close proximity to a personal computer monitor or a word processing terminal, the position of the lampshade and lamp element being readily adjustable to provide desired illumination to documents and other materials under scrutiny.

BACKGROUND OF THE INVENTION

It is often the case that a person, while using a personal computer or a data processing terminal, finds it necessary to refer to notes or other documents. It is obviously preferable that those documents be near to the terminal and keyboard in order to minimize the amount of effort involved, and it is helpful if the documents are well-lighted for ready viewing. However, space is usually at a premium at a computer workstation, and there is often little room for a desk lamp or other lamp of the ordinary variety. Computer users must often rely on the overhead lighting in the room to illuminate the documents under scrutiny, or on a desk or floor lamp located some distance away from the computer.

It is an object of the present invention to provide a lamp that may be placed on and attached to a computer monitor, and may be adjusted in position to provide illumination to adjacent areas as selected by the computer user.

It is another object of the present invention to provide a lamp with a lampshade and lighting element that may be rotated about two mutually perpendicular axes to provide illumination that is adjustable in direction.

It is a further object of this invention to provide a lamp that can deliver high intensity light to a selected work area adjacent a computer monitor.

Other features and objects of this invention will be in part apparent and in part pointed out hereinafter.

SUMMARY OF THE INVENTION

The foregoing objects are achieved, and the aforementioned problems solved, by one illustrative embodiment of the invention in which a lamp comprises a base, a flexible arm extending from the base, and a lampshade attached to the other end of the flexible arm by means of two cooperating connecting members that allow the lampshade to be rotated about a first axis and about a second axis perpendicular thereto. The base may be removably held by a bracket attached by adhesive or other means to a computer monitor, workstation, or other device. A standard socket within the lampshade may receive a high intensity bulb such as a 13 watt compact fluorescent bulb.

BRIEF DESCRIPTION OF THE DRAWINGS

FIG. 1 is a perspective view of a lamp constructed in accordance with a preferred embodiment of the present invention, the lamp being mounted on a computer monitor, with the flexible arm extending from the base of the lamp and attached to a first connecting member, a second connecting member being attached to and rotated on the first connector member, and the lampshade being rotated about its attachment to the second connecting member.

FIG. 2 is a side elevational view of the lamp of FIG. 1, with the lampshade returned to its home (i.e., unrotated) position.

FIG. 3 is a bottom plan view of the lamp of FIG. 2.

FIG. 4 is a partial cut-away view of the internal structure of the lamp as shown in FIG. 2.

FIG. 5a is a plan view of the inner side of the bottom half of the second connecting member as seen in FIG. 2.

FIG. 5b is a plan view of the outer side of the bottom half of the second connecting member shown in FIG. 5a.

FIG. 5c is a sectional view of the bottom half of the second connecting member, taken along line 5c—5c of FIG. 5a.

FIG. 6a is a plan view of the outer side of the top half of the second connecting member as seen in FIG. 2.

FIG. 6b is a cross-sectional view of the top half of the second connecting member shown in FIG. 6a, taken along line 6b—6b of FIG. 6a.

FIG. 6c is a cross-sectional view of the top half of the second connecting member shown in FIG. 6a, taken along line 6c—6c of FIG. 6a.

FIG. 6d is a plan view of one of the two molded projections within the second connecting member that, in cooperation with the side wall, hold the collar in place to permit rotatable connection of the lampshade to the member.

FIG. 7a is a plan view of the inner side of the top half of the first connecting member as seen in FIG. 2.

FIG. 7b is a sectional view taken along the line 7b—7b of FIG. 7a.

FIG. 10a is a plan view of the end of the collar that is received within the lampshade to rotatably attach the lampshade to the second connecting member.

FIG. 10b is a sectional view of the collar of FIG. 10a, taken along lines 10b—10b of FIG. 10a.

FIG. 11a is a partial plan view of the upper half of the lampshade, showing the molded projections for holding one end of the collar in position so that the lampshade is rotatable thereon.

FIG. 11b is a plan view of one of the pair of projections within the upper half of the lampshade, that hold the smaller end of the collar within the lampshade, and illustrating the stop that limits the amount of rotation that the lampshade may undergo.

DETAILED DESCRIPTION OF THE PREFERRED EMBODIMENT

Figure 8B:
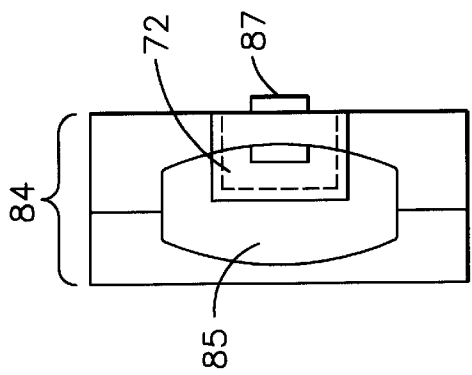
FIG. 8b is an elevational view of the side wall of the first connecting member formed when the two halves shown in FIGS. 8a and 7a are mated, providing a substantially oval aperture to capture the lip at the end of the flexible arm.

Referring to FIG. 1, the lamp of the present invention, designated generally by reference character 10, is shown in position atop a computer monitor. Lamp 10 has a base 12 to which is attached a flexible arm 14. At the other end of arm 14, a first connecting member 16 is fixed, which member in turn is rotatably attached to a second connecting member 17. Lampshade 18 extends from and is rotatably attached to second connecting member 17. The outer housing of flexible arm 14 is comprised of commercially-available accordian-fold plastic tubing like that used in flexible flashlights. A length of standard flexible metal conduit tubing (not shown) extending the length of the arm permits arm 14 to maintain a desired position once the arm is bent or flexed. Arm 14 is preferably flexible substantially in all directions about its locus of attachment to base 12. Connecting member 17 may be rotated about its attachment to connecting member 16 in an arc of about 90 degrees in either direction, as more fully described below. Lampshade 18 may be rotated about its attachment to connecting member 17 through an arc of slightly less than 180 degrees in either direction. Bulb element 30 is seen in position within lampshade 18. An on-off switch 20 is located atop base 12.

Turning to FIGS. 2 and 3, base 12 of lamp 10 is slidably and removably insertable into bracket 22, which bracket may be affixed to the computer terminal by adhesive means shown at 24. A compact fluorescent lamp element 30 is mounted within lampshade 18. Reflecting metallic layer 32 is affixed to the inside wall of lampshade 18. Lower connecting member 16 is fixed to the end of flexible arm 14, as described more fully below. Upper connecting member 17 is attached to lower connecting member 16 by means of a cylindrical projection that extends from member 17 into member 16, as shown in FIG. 4. Lampshade 18 is attached to upper connecting member 17 by means of a collar 46, as shown in FIGS. 4, and 10a and 10b. Lines 26 and 28 are merely decorative and have no functional role.

The internal construction of lamp 10 is illustrated in FIG. 4. Current is supplied to the lamp via conventional power cord 40, which is connected to ballast 42 mounted within base 12, the output thereof being supplied through electrical wiring 43 at the proper voltage to operate fluorescent bulb 30. The preferred embodiment here described employs a 13-watt compact fluorescent bulb available from Osram as Model 13W/827. Wiring 43 is threaded through flexible arm 14 and into lower connecting member 16, fixedly attached to the distal end of arm 14. An aperture 76 in member 16 (FIG. 7a) cooperates with a curved opening 52 in the bottom wall of upper member 17 (FIG. 5a) to permit wiring 43 to be threaded into member 17, and then through member 17 into lampshade 18, where it is connected to a standard fluorescent lamp socket 49.

As stated above, lower connecting member 16 is affixed to the distal end of flexible arm 14. Upper connecting member 17 is rotatably attached to lower connecting member 16 by a threaded bolt 44 held within cylindrical projection 62 (FIG. 6b) which extends downwardly from member 17 into member 16, and is fastened thereto by threaded fastener 45 within member 16. Lampshade 18 is attached to upper connecting member 17 by means of a short, cylindrical collar 46, described more fully below.

FIGS. 5a–5c and 6a–6d depict the construction of the upper connecting member 17. Member 17, as well as the base 12, the lower connecting member 16, the outer casing of lampshade 18, and collar 46, are preferably molded of high impact plastic. FIGS. 5a and 5b depict the inner and outer sides, respectively, of the bottom half 50 of upper connecting member 17. Semi-circular curved opening 52 permits electrical wiring 43 to be threaded from lower connecting member 16 into upper connecting member 17 as shown in FIG. 4. Opening 52, in cooperation with projection 87 on the top of the lower connecting member 16 (FIGS. 7b and 8b) also serves to limit the rotation of upper connecting member 17 to about 90 degrees in either direction, at which points projection 87 contacts an end of curved opening 52 to prevent further rotation.

Circular aperture 54 receives therethrough a cylindrical projection 62 molded into the interior of top half 50 of upper connecting member 17 (FIGS. 6a and 6b). Threaded bolt 44 held in and extending from projection 62 (FIG. 6b) receives a fastener 45 within the lower connecting member 16, to hold the upper connecting member in position and rotatable with regard to the lower connecting member. (See FIG. 4). Screws introduced through holes 58 (FIG. 5b) and molded projections 56 (FIG. 5a) mate with corresponding molded projections 64 (FIG. 6b) in the top half 51 of upper connecting member 17 to hold the two halves together.

FIGS. 5c and 6c depict the mating projections within the two halves of upper connecting member 17 that serve, along with the side walls, to hold in place the collar 46 by which lampshade 18 is rotatably attached to upper connecting member 17. Semi-circular openings 59 and 69 in the side wall mate to form a circular opening to receive cylindrical collar 46, the other end of which is attached to lampshade 18, to permit the lampshade to rotate around said collar, as explained below.

As to the construction of lower connecting member 16, FIG. 7a depicts the inside of the top half 70. Molded tubular projection 72 extends inwardly (see FIG. 4) to receive, in its bore 75 (FIG. 7b), projection 62 from upper connection member 17, the threaded bolt 44 projecting through aperture 73 in tubular projection 72 into the interior of member 16, where a fastener 45 (FIG. 4) is attached to hold the upper connecting member 17 in position with respect to lower connecting member 16, and rotatable on projection 62 seated within bore 75. Small circular aperture 76 in the top half 70 of member 16 permits wiring 43 to be threaded into curved opening 52 in the bottom half of the upper connecting member 17 (FIGS. 5a and 5c).

Figure 8A:
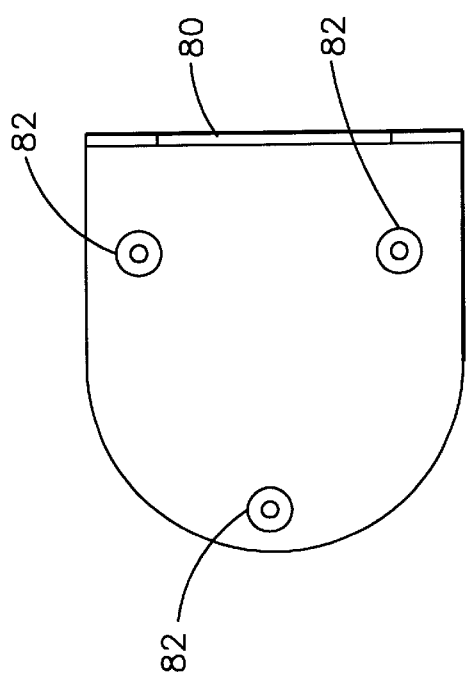
FIG. 8a is a plan view of the inner side of the bottom half of the first connecting member as seen in FIG. 2.

Turning to FIGS. 8a and 8b, screws introduced through inward projections 82 in the bottom half 80 of the lower connecting member 16 mate with projections 74 in the top half 70 to fasten the two halves together. Circular projection 87 surrounds aperture 76 at the top surface of the lower connecting member 16, and fits within curved opening 52 in the bottom of upper connector member 17, to prevent rotation of member 17 beyond about 90 degrees in either direction, as stated above.

Figure 9:
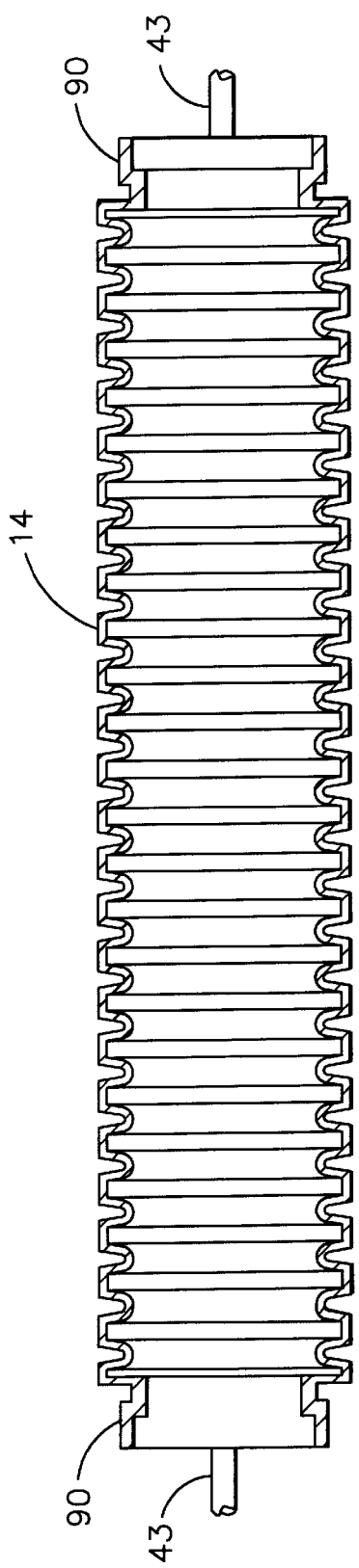
FIG. 9 is a length-wise sectional view of the flexible arm.

One end of flexible arm 14 (FIG. 9) is received within the substantially oval aperture 85 in the side wall 84 (FIG. 8b) of lower connecting member 16, while the other end is received within a similar aperture in base 12 (not shown). Each end of flexible arm 14 includes a substantially oval projecting lip 90 slightly larger than the aperture 85 in the side wall 84 of lower connecting member 16 (FIG. 8b). The end of the arm 14 is thus captured in place when the halves of lower connecting member 16 are screwed together. The like aperture in base 12 similarly captures lip 90 at the other end of flexible arm 14. Electrical wiring 43 is threaded through the flexible arm, and is held in place within a length of standard flexible metal conduit tubing extending the length of the arm (not shown).

FIGS. 10a and 10b depict the cylindrical collar 46 that connects lampshade 18 to upper connecting member 17 and permits rotation of the lampshade with respect to member 17. Collar 46 comprises a central tubular section 101 having a thin, back member 102 projecting outwardly from the edge thereof, the back member 102 having a flat edge 106. Back member 102 is captured between the side wall and a pair of molded projections 57 (FIG. 5a) and 67 (FIGS. 6a and 6d) in upper connecting member 17. These projections mate to form a circular aperture similar to the circular aperture in the side wall, the aperture in these projections facilitating the threading of wiring 43 through collar 46 into the lampshade 18. Collar 46 projects outwardly through the circular opening created when semi-circular wall openings 59 and 69 are mated. The flat edge 106 of back member 102 rests against the interior wall of the lower half of upper connecting member 17, and, in cooperation with projections 57 and 67 and side wall 84, prevents collar 46 from rotating.

Extending axially from the other end of central section 101 is cylindrical projection 103. Raised circumferential lip 104 on projection 103 is captured within lampshade 18 by means of mating projections 48 (FIG. 4) in the upper and lower halves of lampshade 18. FIGS. 11a and 11b provide a closer view of projections 48. The central section 101 of collar 46 is received through a circular opening 114 formed in the side wall of lampshade 18 when the bottom and top halves of lampshade 18 are snap-fit together, corresponding to the circular opening formed in the side wall of upper connecting member 17 when semi-circular openings 59 and 69 are mated. Smaller cylindrical section 103 rests on the mating pair of projections 48 closest to the side wall of the lampshade, and circumferential lip 104 is captured between the mating pairs of projections 48 when the two halves of lampshade 18 are mated. Lampshade 18 may thus be rotated around collar 46, projections 48 serving to capture circumferential lip 104 of collar 46, to hold lampshade 18 in position vis-a-vis upper connecting member 17 as the lampshade is rotated. Finger 105 formed in lip 104 projects therefrom at an angle of slightly less than 90 degrees with respect to flat edge 106. Finger 105 cooperates with a corresponding stop 111 located between projections 48 (FIGS. 11a and 11b) within the top half of lampshade 18 to prevent lampshade 18 from turning more than about 180 degrees in either direction, because finger 105 will then hit stop 111 at that point. Electrical wiring 43 is threaded from upper connecting member 17, through the bore of collar 46, and into the interior of lampshade 18 for connection to socket 49, as shown in FIG. 4.

The preferred embodiment of the lamp here shown may be removably attached atop the monitor of a personal computer, as shown in FIG. 1, by means of a c-shaped bracket 22 (FIGS. 1–3) into which base 12 may be slidably and removably secured. An adhesive pad 24 affixed to the bottom of bracket 22 may be utilized to affix bracket 22 to the monitor.

Thus the lamp of the present invention provides a highly adjustable source of high intensity illumination, readily employable at a data processing workstation, personal computer, or other device. Various other changes could be made to the preferred embodiment described above, without departing from the scope of the subject invention. Thus, although only one embodiment of the invention has been described and illustrated, these and other modifications will be readily apparent to those skilled in the art. Such modifications and other obvious changes are intended to be covered by the following claims.

What is claimed is:

1. A lamp comprising:
   a base;
   a flexible arm attached at a first end to and extending from the base;
   a first connecting member affixed to the second end of said flexible arm;
   a second connecting member rotatably attached to said first connecting member, and rotatable about a first axis of rotation;
   a lampshade rotatably attached to said second connecting member, and rotatable about a second axis of rotation perpendicular to said first axis of rotation; and
   a lamp socket located within said lampshade.

2. The lamp of claim 1, wherein electrical power is supplied to said socket by means of electrical wiring emanating from the base, and feeding through the interior of said flexible arm into said first connecting member, into said second connecting member, and then into said lampshade.

3. The lamp of claim 2, wherein said first connecting member includes a first aperture for fixedly receiving the second end of said flexible arm and for allowing receipt of said electrical wiring with said first connecting member, and a second aperture to permit said wiring to exit to said second connecting member.

4. The lamp of claim 3, wherein said second connecting member has a curved slot cooperating with said second aperture in said first connecting member to accommodate said electrical wiring as said second member is rotated with respect to said first member.

5. The lamp of claim 4, further comprising a cylindrical collar, and wherein said second connecting member has a side wall facing said lampshade, the side wall including means for fixedly capturing one end of said collar, and wherein the lampshade includes corresponding means for rotatably securing the other end of said collar, to permit the lampshade to be rotated about said collar with respect to said second connecting member.

6. The lamp of claim 5 wherein said collar and said means for rotatably securing the collar include means for stopping further rotation of the lampshade at a predetermined point.

7. The lamp of claim 1, further comprising a bracket for removably holding the base therein, said bracket being adapted for affixation to the surface of a computer monitor or workstation.

8. The lamp of claim 3 wherein said second aperture is located in the top surface of the first connecting member and is surrounded by a projection from said top surface, and wherein said second connecting member includes a curved opening in its bottom surface, which curved opening receives said electrical wiring from said first connecting member into said second connecting member, and wherein said projection is received into and cooperates with said curved opening to limit the amount of rotation that the second connecting member may undergo with respect to the first connecting member.

9. The lamp of claim 5, wherein said collar includes a central bore that permits said electrical wiring to pass from said second connecting member to said socket in the lampshade.

10. The lamp of claim 1, wherein said second connecting member includes a cylindrical projection extending from the bottom thereof, the projection having a rod projecting axially therefrom, and said first connecting member includes a tubular inwardly-directed projection in its upper surface forming a bore for rotatable receipt of said cylindrical projection, the cylindrical projection being rotatably affixed within said bore by a fastener attached to the end of said rod within said first connecting member.

11. The lamp of claim 1, further comprising an electrical ballast located within said base and having an input connection and an output connection.

12. The lamp of claim 11, further comprising an electrical power cord connected to the input connection of said ballast, and electrical wiring connected at one end to the output connection of said ballast, and at the other end to an electrical socket located within said lampshade.

* * * * *